United States Patent [19]

Brown et al.

[11] 4,142,268

[45] Mar. 6, 1979

[54] ATTACHMENT OF WINDSCREEN WIPER BLADES TO WIPER ARMS

[75] Inventors: Edward G. Brown, Sunbury-on-Thames; Eric J. Turner, London, both of England; Philip G. K. Smithers, deceased, late of Hounslow, England; by John J. Juviller, executor, London, England

[73] Assignee: Trico Products Corporation, Buffalo, N.Y.

[21] Appl. No.: 897,505

[22] Filed: Apr. 18, 1978

[30] Foreign Application Priority Data

Apr. 21, 1977 [GB] United Kingdom ............... 16579/77

[51] Int. Cl.² .............................................. B60S 1/40
[52] U.S. Cl. ................................................ 15/250.32
[58] Field of Search ........................ 15/250.31–250.35, 15/250.42

[56] References Cited

U.S. PATENT DOCUMENTS

| 3,757,377 | 9/1973 | Hayhurst | 15/250.32 |
| 3,843,994 | 10/1974 | Smithers | 15/250.32 |
| 3,896,519 | 7/1975 | Pankow | 15/250.32 |
| 4,023,232 | 5/1977 | Smithers | 15/250.32 |

FOREIGN PATENT DOCUMENTS 2142235  1/1973  France .................................. 15/250.32

Primary Examiner—Peter Feldman
Attorney, Agent, or Firm—E. Herbert Liss

[57] ABSTRACT

A pair of molded plastic components are juxtaposed face to face to form a body, U-shaped in longitudinal cross section on a plane perpendicular to the juxtaposed faces and include flanges on the sides thereof. The external shape of the assembled body fits into a U-shaped space defined by the end of a wiper arm of the "shepherd's crook kind". The juxtaposed faces each have formed therein a transverse semi-cylindrical recess. When the sections are arranged face to face the recesses form a transverse bore to contain a grooved pin extending transversely from the side of a wiper blade harness. An internal circumferential projection in the recesses engages the groove in the pin; the flanges engage the side edges of the arm. A pair of resilient detents projecting outwardly from the web portion of the U-shaped body engage the web of the shepherd's crook arm.

5 Claims, 6 Drawing Figures

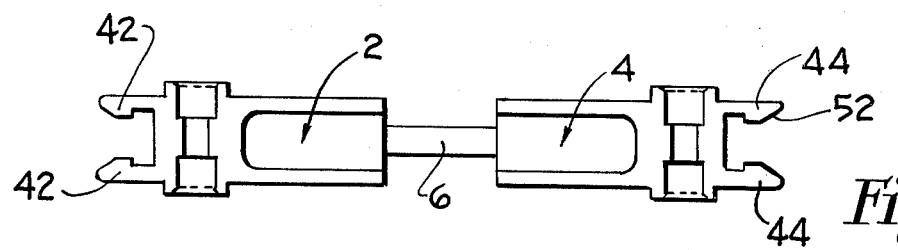
Fig.1
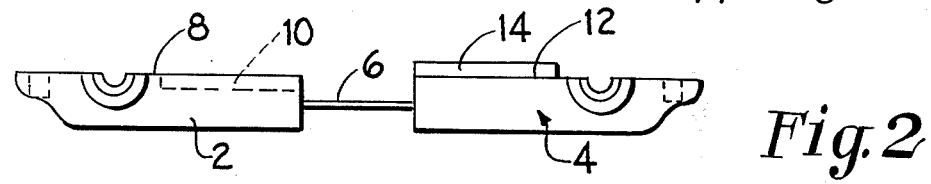
Fig.2
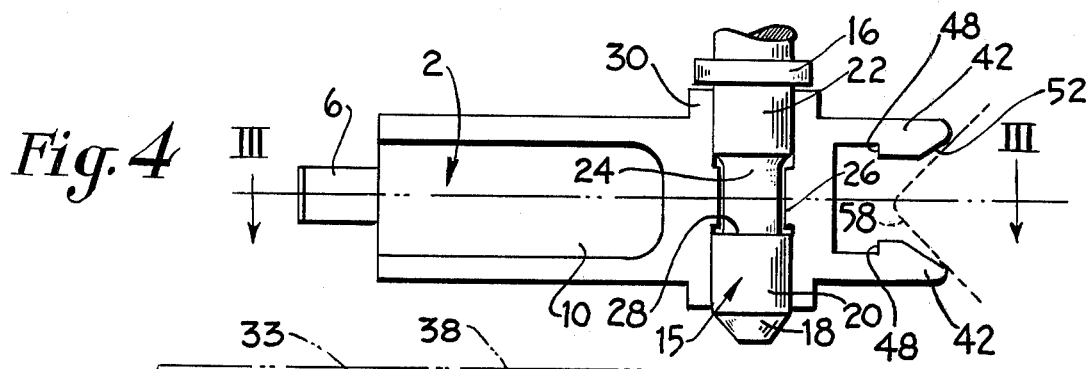
Fig.4
Fig.5
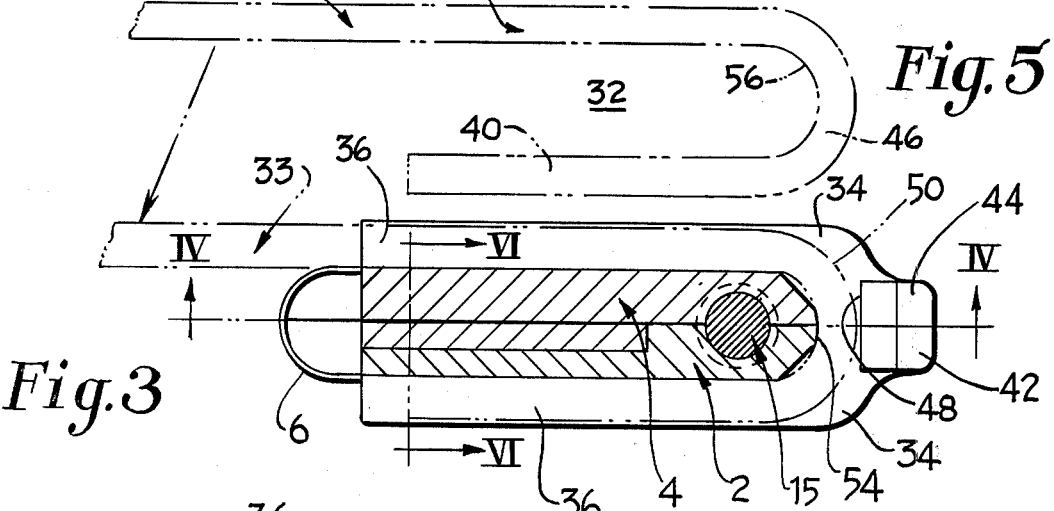
Fig.3
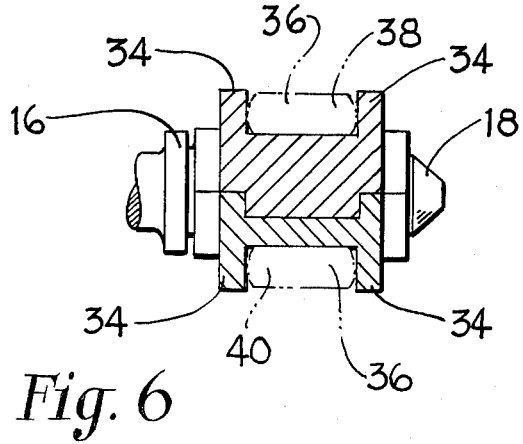
Fig.6

ATTACHMENT OF WINDSCREEN WIPER BLADES TO WIPER ARMS

BACKGROUND OF THE INVENTION

This invention is concerned with the attachment of windscreen wiper blades to wiper arms, in particular with the use of adaptors to allow side-mounting blades to be used with types of wiper arms not expressly intended to carry them.

A known type of side-mounting wiper blade includes a circumferentially grooved mounting pin, extending from a side of the blade, and lying in use approximately parallel to the windscreen being wiped. One example of such a wiper blade is shown in British Pat. No. 1,254,109.

The invention concerns adaptors to attach side mounting wiper blades of the type described above to wiper arms of "shepherd's crook" kind. One example of such an arm is shown in British Pat. No. 726,275. Such an arm has an outer portion formed of bar and comprising, in succession, a straight main part, a part curved into semi-circular shape, and a short straight terminal part, parallel to and spaced from the lower face of the main part.

"Shepherd's crook" arms are widely in use on existing cars in conjunction with wiper blades which are not of the side mounting kind. It is advantageous to a user of such a car to be able to replace an existing wiper blade by a side mounting blade because it is recognized that a side mounting blade gives a superior performance as compared with older kinds of blades. For example they provide a lower profile which results in less exposure to lifting by airflow when the car is traveling at high speeds and present a better appearance. However, present blades for "shepherd's crook" arms are equipped with a special arm-to-blade connector for retaining the blade on the "shepherd's crook" arm. There are, readily available for replacement, side mounting blades carrying a grooved pin which is accomodated by special arms which carry a receptor for the pin.

At present there is no universal adaptor for effecting interchangeability and compatability between "shepherd's crook" arms and side mounting blades. Although couplers and adaptors have been provided for attaching "shepherd's crook" type arms to side mounted blades the known couplers are either required to be permanently affixed to the pin or are retained by detent means which cooperate with corresponding latching means on the arm such as a shoulder or aperture.

An example of the permanently affixed type is shown in U.S. Pat. No. 3,843,994 issued Oct. 29, 1974. This coupler is designed for use with a blade having a latching receptor for a pin type arm-to-blade connector wherein the pin is secured to the arm. Alternatively it may be permanently attached to a laterally extending pin secured to the blade during manufacture. It is not intended for connecting a side mounting blade having a grooved mounting pin to a blade for side mounting on a "shepherd's crook" arm.

An example of an adaptor which is retained by cooperating detent means on the arm and blade is illustrated in U.S. Pat. No. 4,023,232 issued May 17, 1977, priority date May 31, 1975. This adaptor is dependent on the shape of the hook end of the arm as well as the location and shape of the piercing in the arm.

SUMMARY OF THE INVENTION

The unique adaptor of the present invention provides for use on a blade with a grooved pin type connector which can be side mounted on a "shepherd's crook" type arm. It is not dependent upon the shape of the hooked end of the "shepherd's crook" arm or the location and shape of the cooperating latching element on the hooked end of the "shepherd's crook" arm. It is useful with a set of components including a wiper blade and a wiper arm. The wiper blade may include a circumferentially grooved mounting pin extending from a side of the blade. The wiper arm includes an outer portion formed of a bar and comprises in sequence a straight main part, a part curved into semicircular shape and a short straight terminal part parallel to and spaced from a lower face of the main part. The adaptor itself comprises two components which can be assembled to meet substantially in a plane containing the axis of the pin and thus constitute a body having an external shape which fits into the U-shaped space defined by the parts of the arm, each component defining a half of a bore to contain the pin. The bore includes an integral internal annular rib which is complementary to the groove in the pin. At least one of the components of the adaptor may include flanges to engage the sides of the arm and to locate the adaptor laterally of the arm. At least one of the components includes resilient detent means to engage a portion of the arm so as to locate the adaptor longitudinally of the arm. The components may be integrally linked by a flexible strap and have mating portions which engage each other in assembled position to resist relative displacement of the components.

Accordingly an object of the present invention is to provide an improved adaptor for accomodating a "shepherd's crook" arm to blade of the side mounting type carrying a grooved pin extending laterally therefrom wherein the adaptor is universally compatible with a number of "shepherd's crook" type arms.

Other objects and advantages of the invention will be apparent from the detailed description taken in connection with the accompanying drawings.

BRIEF DESCRIPTION OF THE DRAWINGS

FIG. 1 is a plan of an adaptor;
FIG. 2 is a side elevation of the same adaptor;
FIG. 3 is a section on the line III—III of FIG. 4;
FIG. 4 is a section on the line IV—IV of FIG. 3;
FIG. 5 is an outline side elevation of the outer portion of a wiper arm; and
FIG. 6 is a section on the line VI—VI of FIG. 3.
(FIGS. 3, 4, 5 and 6 are on a larger scale than FIGS. 1 and 2.)

DETAILED DESCRIPTION

The adaptor consists of two components 2 and 4, which are integrally linked by a flexible strap 6. The components and strap can be made in the attitude shown in FIGS. 1 and 2, by injection molding of a plastics material in a single mold. A suitable plastics material is polycarbonate. The two components 2 and 4 are identical, except for mating portions for resisting displacement relative to each other in a plane parallel to the axis of the pin. For example, component 2 may have a flat bounding surface 8, in which is a recess 10, whereas the component 4 may have a flat bounding surface 12, on which is a projection 14. The projection 14 matches the recess 10, so that the two components can be assembled, with their faces 8, 12 in contact, being located relatively to one another by entry of the projection 14 into the recess 10. This is the condition shown in FIG. 3.

During this assembly operation, the strap 6 is bent round in a semi-circle. The purpose of the strap 6 is to ensure that a user always has readily available two components which will fit together as required and to enable manufacture from a single mold.

The pin 15 of the wiper blade is shown in FIG. 4. The pin has a collar 16, and in FIG. 4 the part of the pin above the collar is not shown. This part serves as a pivot between components of a harness of a wiper blade, in a well-known manner. The part of the pin below the collar 16 in FIG. 4 serves as the actual mounting pin. It has a tapered nose 18, and two cylindrical portions 20, 22 of equal diameter. between which is a circumferential groove 24.

The components 2 and 4 each include semi-cylindrical recesses; when assembled, as shown in FIG. 3 the recesses define a transverse cylindrical bore which matches the pin. In use, therefore, the components can be assembled around the pin, as shown in FIG. 3. One or both recesses include internal means for engaging the groove in the pin. As illustrated, by way of example, an integral internal annular rib 26 is shown which is complementary to the groove 24 in the pin. The rib 26 cooperates with one boundary 28 of the groove, to resist relative movement of the pin and the components along the axis of the pin, and a boss 30 on one side of the components cooperates with the flange 16 of thepin to resist motion in the opposite direction. Thus, the only relative motion permitted is relative rotation about the axis of the pin.

At the same time, the two components 2 and 4 constitute a body having an external shape which fits into the U-shaped space 32 defined by the parts of the wiper arm 33 shown in FIG. 5. This fitting is shown in FIG. 3. (The wiper arm is not shown in FIG. 4).

Each of the components has two flanges 34 defining a channel 36 to receive a respective straight part 38, 40 of the wiper arm (FIG. 6).

In addition, the body constituted by the two components 2 and 4 has two resilient detents, each detent being made up of a part 42 on the component 2 and a part 44 on the component 4. Considering in particular the parts 42, shown in FIGS. 3 and 4, the detents extend past the sides of the curved part 46 of the wiper arm, and have shoulders 48 which engage the outer face 50 of the curved part 46.

The body is assembled with the wiper arm by movement from left to right, as seen in FIGS. 3 and 4, and the detents have bevelled surfaces 52 which enable the detents to ride past each side of the curved part 46, until the shoulders 48 snap into engagement with the surface 50.

In this condition, the presence of the wiper arm prevents separation of the two components 2 and 4 of the adaptor, and consequently the pin is trapped in assembled conditon with the adaptor. At the same time, the shoulders 48 prevent separation of the adaptor from the wiper arm. In use, the shoulders 48 do not experience large loads, because centrifugal forces on the wiper blade unit tend to cause the adaptor to move to the right in FIGS. 3 and 4 relatively to the wiper arm, and this movement is resisted by engagement of a large surface 54 of the body with the inner face 56 of the curved part 46 of the wiper arm.

One method of releasing the adaptor from the wiper arm is to engage the bevel surfaces 52 with the corner of a rigid object, as indicated by the broken line 58 in FIG. 4, and then apply to the wiper arm a force towards the right. This causes the wiper arm to exert a force towards the right against the shoulders 48, and in consequence the bevelled surfaces 52 ride to the right relatively to the corner 58, and become spread apart, until the detents separate to an extent sufficient to enable the curved part 46 of the wiper arm to pass the shoulders 48, and move to the right. Thereupon, the corner 58 can be removed, and the body comprising the two components 2 and 4 can be totally disengaged from the wiper arm by shifting to the left in FIG. 3 relatively to the wiper arm. Finally, the two components 2 and 4 can be separated to release the pin.

However, when the wiper arm is secured to a wiper shaft of a vehicle, it may be possible to release the adaptor by exerting force by hand on it, or on the wiper blade unit, without the use of any tool.

It can be seen that a simple, readily useable adaptor for accomodating a side mounting wiper blade on a "shepherd's crook" arm has been provided. Although a specific embodiment of the invention has been shown and described for the purpose of illustration, it will of course be apparent that various modifications are possible within the scope of the invention. For example, the flanges on one of the adaptor components may be omitted. The two components of the adaptor may be identical with each having a recess at one side of the longitudinal central plane and a complementary projection at the other side of the plane; the connecting strap may be omitted; the flanges may be relied upon for location in directions parallel to the axis of the pin, thereby permitting omission of the recess 10 and projection 14. There are a number of "shepherd's crook" wiper arms in existence which differ from one another in the nature of the latching element or the dimensions and precise shape of the terminal part and it is apparent that the present adaptor can be adapted for use in a variety of these "shepherd's crook" type arms. It is to be understood, therefore, that the invention is not limited to the specific arrangement shown but in its broadest aspects it includes all equivalent embodiments and modifications which come within the scope of the invention.

What is claimed is:

1. In a windscreen wiper arm and blade assembly comprising a wiper blade including a circumferentially grooved mounting pin extending from a side of the blade, defining a shoulder near the ends of said pin, a wiper arm formed of a bar and comprising in succession a straight main part, a part curved into a semi-circular shape and a short straight terminal part, parallel to and spaced from a lower face of the main part; the improvement comprising an adaptor for securing the arm to the blade, the adaptor comprising a pair of components which when in operative position lie in juxtaposed face to face relationship forming a body having an external shape corresponding to and receivable within the U-shaped space defined by said parts of said arm, each component having a transverse cylindrical recess positioned on its face adjacent the other of said components and aligned to form a transverse pin receiving bore, at least one of said recesses including internal means for engaging the groove in said pin, at least one of said components including means to engage the sides of the arm and to limit lateral movement thereof, and at least one of said components having resilient detent means for engaging a portion of said arm to limit longitudinal movement thereof.

2. Apparatus according to claim 1 in which the said pair of components of the adaptor have mating portions which resist displacement of the said pair of components relative to each other in a plane parallel to the axis of the pin.

3. Apparatus according to claim 2 in which the said pair of components of the adaptor are integrally linked by a flexible strap.

4. Apparatus according to claims 1, 2 or 3 in which said internal means comprises an internal projection, said internal projection on one component and said internal projection on the other component together constitute an annular rib which is complementary to the groove in the pin.

5. Apparatus according to claims 1, 2 or 3 in which each component of the said pair of components of the adaptor includes outwardly extending parallel flanges defining a channel to receive a respective straight part of the arm.

* * * * *